United States Patent [19]

Hyde et al.

[11] 4,429,916
[45] Feb. 7, 1984

[54] INFANT CAR SEAT

[75] Inventors: Richard E. Hyde, Palos Verdes; Gary L. Smith, Los Angeles; Lee T. Carmichael, Pasadena; Albert E. Meader, Palos Verdes, all of Calif.

[73] Assignee: California Strolee, Inc., Compton, Calif.

[21] Appl. No.: 237,491

[22] Filed: Feb. 23, 1981

[51] Int. Cl.³ .............................................. B60R 21/10
[52] U.S. Cl. .................................... 297/250; 297/216; 297/488
[58] Field of Search ............... 297/250, 255, 216, 487, 297/488, 467, 377, 254, 150, 154; 280/751

[56] References Cited

U.S. PATENT DOCUMENTS

| 2,661,221 | 4/1951 | Lockwood et al. | 280/751 |
|---|---|---|---|
| 3,133,746 | 5/1964 | Zazzara | 280/753 |
| 3,262,736 | 7/1966 | Merelis | 297/467 |
| 3,279,817 | 6/1964 | Henry | 280/750 |
| 3,762,768 | 10/1973 | Hyde et al. | 297/253 |
| 3,791,694 | 2/1974 | Roberts et al. | 297/467 |
| 3,819,197 | 6/1974 | Shakespear | 297/478 |
| 3,829,158 | 8/1974 | O'Connor | 280/751 X |
| 3,918,760 | 11/1975 | Goldberg | 297/488 |
| 3,948,556 | 4/1976 | Hyde | 297/250 |
| 3,992,056 | 11/1976 | Koziatek et al. | 297/250 |
| 4,033,622 | 7/1977 | Boudreau | 297/250 |
| 4,040,664 | 8/1977 | Tanaka et al. | 297/488 |
| 4,047,755 | 9/1977 | McDonald et al. | 297/216 |
| 4,082,350 | 4/1978 | Tomforde | 297/243 |
| 4,164,357 | 8/1979 | Conachey | 297/250 |
| 4,186,961 | 2/1975 | Schubert | 280/751 |
| 4,186,962 | 2/1980 | Meeker | 297/250 |
| 4,302,049 | 11/1981 | Simpson | 297/484 |
| 4,339,149 | 7/1982 | Nakao et al. | 297/250 |
| 4,342,483 | 8/1982 | Takada | 297/488 |
| 4,343,510 | 8/1982 | Cone | 297/250 |
| 4,345,791 | 8/1982 | Bryans et al. | 297/250 |

FOREIGN PATENT DOCUMENTS 2545915  4/1976  Fed. Rep. of Germany ...... 297/250

Primary Examiner—James T. McCall
Attorney, Agent, or Firm—Lyon & Lyon

[57] ABSTRACT

A portable infant car seat which provides protection and restraint for a child while in an automobile is disclosed. An arm rest/shield biased to a raised position is held in a lower position by a harness system used to restrain and protect the child. Opening of the harness system allows the arm rest/shield to automatically swing into the raised position thereby facilitating easy removal of the child or warning that the harness system is not secured.

14 Claims, 6 Drawing Figures

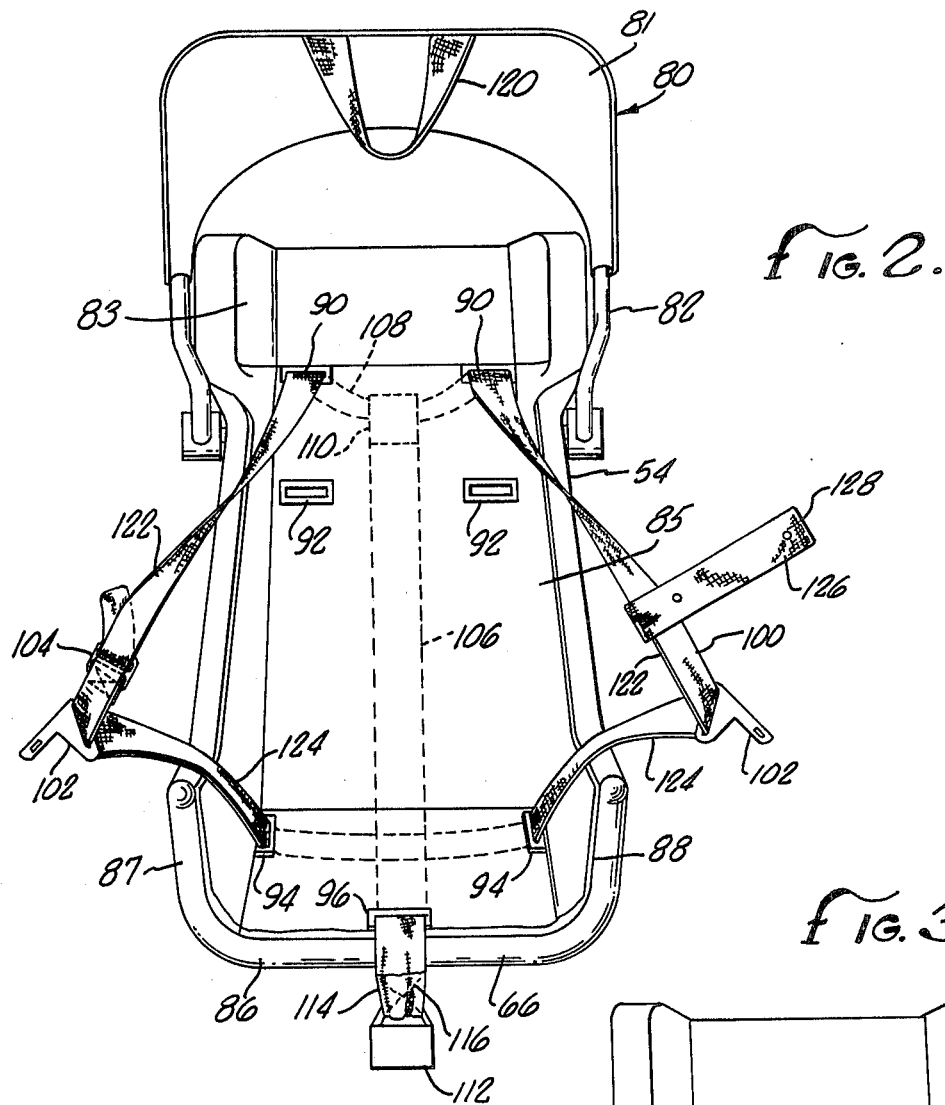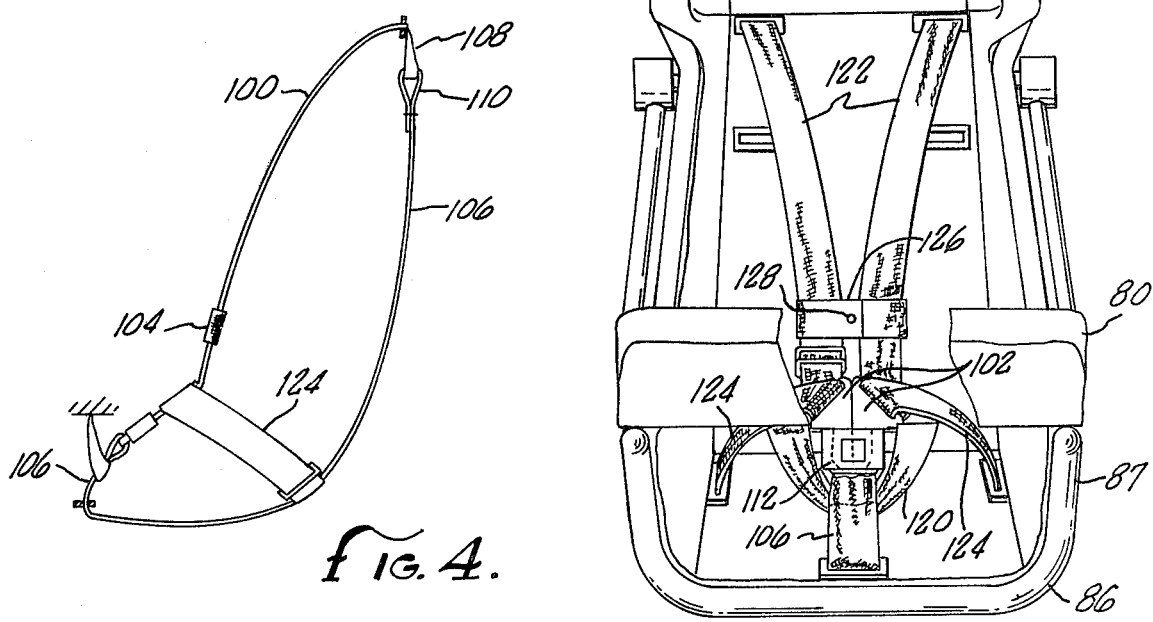

INFANT CAR SEAT

BACKGROUND OF THE INVENTION

This invention relates generally to infant car seats which are placed on conventional automobile seats and more particularly to those employing an internal harness system to protect and restrain the child.

Infant car seats are becoming well known in the art because of the increasing need to travel with small children. It is impractical to permanently incorporate these types of seat with an automobile at the time of manufacture; therefore, it has been necessary to fashion portable units.

Since it may be necessary to carry these infant car seats to and from the automobile, it is advantageous to construct them from lightweight materials which have a high strength associated therewith. This has primarily been accomplished by incorporating a rigid plastic seat structure with a support frame composed of metal tubes adapted to support the seat structure above the automobile seat. Moreover, by supporting the seat structure about the seat, the child is able to view out the windows of the automobile.

The seat structure may be contoured to provide a headrest integral with a back portion. Secured to the back portion is a bottom portion which may have side arm rests extending upwardly therefrom. The entire seat structure may be provided with protective upholstery to shield the child and increase the child's comfort.

It has also been found that the safety belts provided with most passenger automobiles are not adapted for use with a child. Consequently, it is desirable to provide independent harness and restraint systems with infant car seats. Various previous manufacturers of these infant car seats have utilized front shields as restraint or protective mechanisms, which in their operative position are disposed forward of the child and are operative to protect the child in the event of a rapid deceleration of the automobile. These front shields may be equipped with padding or protective upholstery to further protect and increase the comfort of the child.

Other manufacturers have used a seat belt arrangement with the infant car seat to restrain the child in the event of a rapid deceleration of the automobile. Often seat belts do not provide adequate support for the child.

Reference is made to U.S. Pat. Nos. 3,290,092 to Howard, 3,206,247 to Johnson and 3,101,972 to Laughlin wherein infant car seats are disclosed which are portable and can be carried into an automobile and connected to the automobile seat or merely made to rest on the automobile seat. Reference is also made to U.S. Pat. Nos. 3,669,492 to Peterson, 3,645,548 to Briner and 2,864,429 to Combs wherein infant car seats are employed in an automobile and are secured to the automobile seat by in some manner hooking the child car seat over the back of the automobile seat.

It is apparent that the infant car seats described in the aforementioned disclosures illustrate means by which children may be transported within an automobile. However, adequate protection and support for the child are not provided by many of the car seats shown. Thus, the child is prone to slouch or bend forward, thereby reducing the effectiveness of the infant car seat in the event of an accident or rapid decleration. Moreover, it is often difficult to determine if the safety belts are securely fastened or whether any activity by the child may have caused their latching mechanism to open.

Furthermore, existing devices which have a front shield disposed forward of the child occasionally make removal of the child from the infant car seat difficult. Even if the front shield is rotated to a position such that the child may be removed, the front shield may assume its original position, thereby causing some impediment to the removal of the child.

Lastly, reference is made to U.S. Pat. No. 3,948,556 to Hyde, et al., wherein an infant car seat is illustrated which has substantial advantages over those previously available. In that disclosure an infant car seat has a front shield disposed in close proximity to the child for protective purposes. A crotch strap is operative to prevent the child from sliding below the front shield.

SUMMARY OF THE INVENTION

Accordingly, the present invention is an improved infant car seat which overcomes deficiencies in the prior art.

There is disclosed a portable infant car seat which is adapted to provide independent protection and support for a child. A seat structure comprising bottom, back and head portions is suspended above an automobile seat by a foldable support frame made of multiple tubular members. Means are provided with the support frame to utilize the safety belt associated with the automobile seat to secure the infant car seat immovably upon the automobile seat.

The support frame has means associated therewith for rotating the seat structure into a plurality of positions without having to readjust the infant car seat with respect to the automobile seat. The support frame is also foldable into a convenient collapsed configuration for storage or carrying.

A five-point internal harness system is attached to the seat structure and comprises, in the preferred embodiment, shoulder, lap and crotch straps. In the preferred embodiment the shoulder and leg straps are formed from one continuous belt which has dual clasp members disposed along its length so as to form the opposing pairs of shoulder and lap straps. An adjustment means is disposed along the length of the continuous belt and is adapted to increase or decrease the length of the shoulder and lap straps. A single belt is affixed to the continuous belt and forms the crotch strap. A buckle member is provided with the crotch strap and is adapted to receive the clasps associated with the shoulder and lap straps. Means are also provided with the seat structure to adjust the position of the shoulder straps along the length of the back portion of the seat structure thereby accommodating children of different sizes.

Rotatably affixed to the back portion of the seat structure is an arm rest/shield biased, preferably by spring means, to the raised position. The arm rest/shield has padding affixed thereto to protect the child and further increase his comfort in the infant car seat. There are means provided with the arm rest/shield for receiving the crotch strap, thus securing the arm rest/shield in the lowermost position in front of the child when the entire harness system is properly in place for travel.

The cooperation of the shoulder, lap and crotch straps with the arm rest/shield simultaneously accomplishes two goals which were not provided by the prior art seats of this nature. First, the arm rest/shield can only be secured in the lowermost position by the proper coordination of shoulder, lap and crotch straps. This defeats the tendency of some parents to rely only on the arm rest/shield to secure and protect the child. Second, upon release of the internal harness system, the arm rest/shield automatically moves to the raised position, thereby facilitating easy removal of the child from the infant car seat. The use of an arm rest/shield member previously required the adult to utilize one hand to hold the arm rest/shield and one hand to remove the child. With the present invention this potentially cumbersome operation is eliminated.

Affixed to the seat structure is a means for maintaining the back portion of the seat structure in close proximity to the upwardly extending portion of the automobile seat. In the preferred embodiment this means comprises a tether strap and associated securing elements.

Thus, it is an object of the present invention to provide an improved infant car seat having an internal harness system which cooperates with an upwardly biased arm rest/shield to protect and secure a child in the infant car seat.

It is a further object of the present invention to provide an infant car seat which has an arm rest/shield biased to the raised position and adapted to facilitate easy removal of the child from the infant car seat.

It is another object of the present invention to provide an internal harness system associated with an infant car seat wherein the harness system has a five-point configuration and only one buckle member.

These and other objects of the present invention will be apparent to one skilled in the art from a reading of the detailed description of the preferred embodiment and the appended claims.

BRIEF DESCRIPTION OF THE DRAWINGS

FIG. 2 is a front view of the infant car seat according to the present invention illustrating the shoulder, crotch and lap straps and the rotatable arm rest/shield in a raised position.

FIG. 3 is a front view of the infant car seat according to the present invention illustrating the position of the shoulder, crotch, and lap straps and the arm rest/shield in an operative or closed position.

FIG. 4 is a side view of the internal harness system of the infant car seat according to the present invention illustrating the engagement of the shoulder, crotch and lap straps.

BRIEF DESCRIPTION OF THE PREFERRED EMBODIMENT

Figure 1:
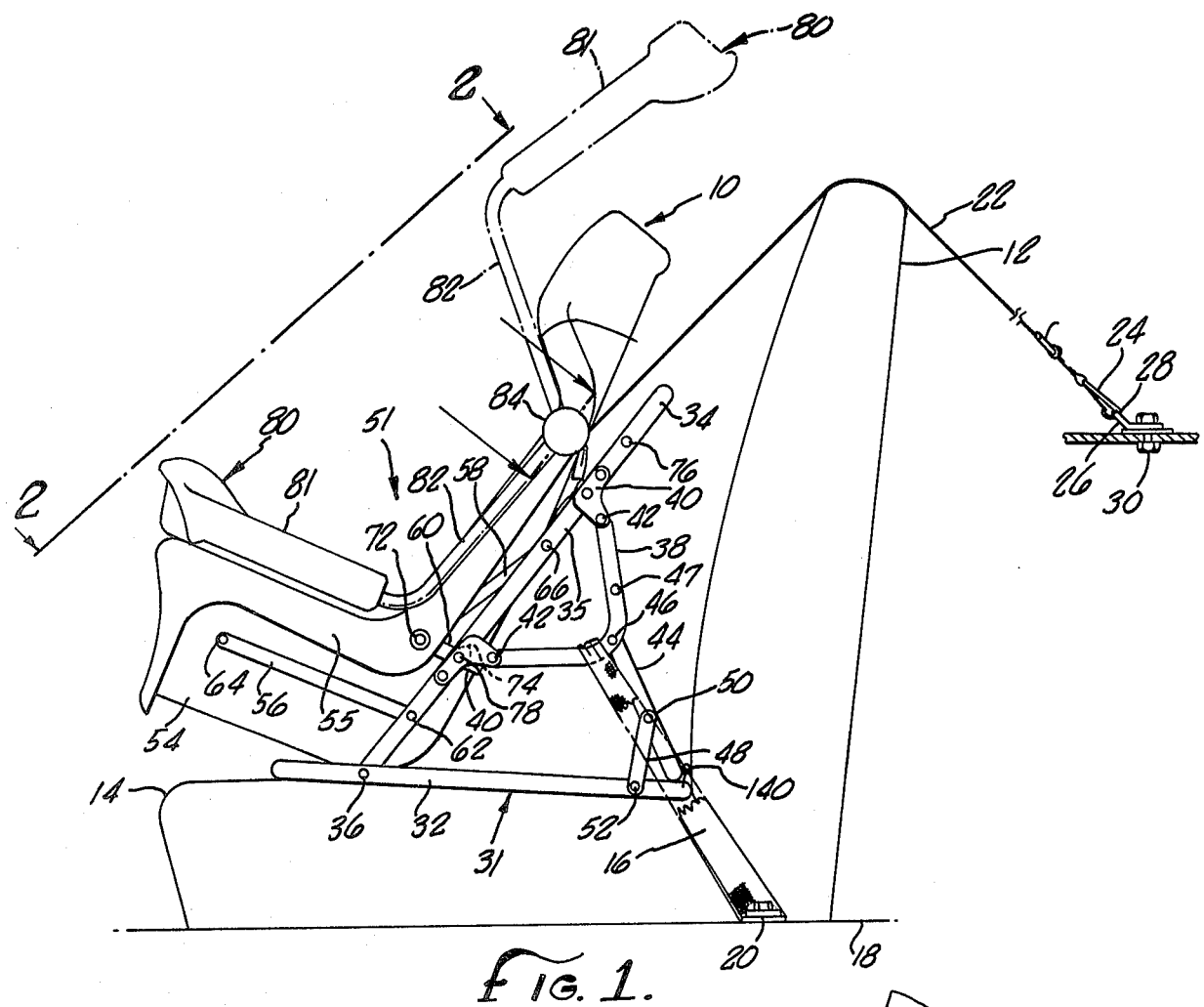
FIG. 1 is a side perspective view of the infant car seat according to the present invention and shown in an inclined position.

Referring to the figures, wherein multiple views of the present invention are presented and like parts are designated by like numerals in the several views, in FIG. 1, there is presented an infant car seat generally indicated by the numeral 10. The infant car seat 10 may assume two positions when used in the automobile. In FIG. 1, the infant car seat 10 is shown in the inclined position which is desirable when the child is resting in the automobile. As described hereinafter, the infant car seat 10 may also assume an upright position by rotating the support frame. This position is desirable to enable the child to view out the windows of the automobile.

The infant car seat 10 is disposed forward of the upwardly extending back portion 12 of an automobile seat and atop the bottom portion 14 of said automobile seat. A standard automobile safety belt 16, as provided with most automobiles, is secured to rigid structures 18 within the automobile by customary means such as a bolt 20. As disclosed hereinafter, the seat belt 16 is useful in securing the infant car seat 10 substantially immovably above the automobile seat portion 14.

It should be noted that the infant car seat 10, because of its versatile and compact design, is utilizable with either standard automobile seats or bucket seats as found in many smaller or sportier model automobiles.

It should further be noted that since the opposite sides of the infant car seat 10 are identical, only one of the sides will be described in considerable detail, and it should be understood that the same numerals apply to corresponding elements or structures on the opposite side of the infant car seat 10. Such symmetry is preferred, although variations are well within the skill of the art and the scope of the invention.

Affixed to the infant car seat 10 in a rigid manner is a tether strap 22 which extends over the back portion 12 of the automobile seat. The tether strap 22 has a disconnection fitting 24 at its lower end which is adapted to facilitate easy removal of the infant car seat 10 from the automobile when not in use. A bracket 26 having an aperture 28 substantially in the center thereof provides attachment for the fitting 24. The bracket 26 is adapted to be secured in accordance with manufacturer instructions to the appropriate structures of the automobile by conventional means, which may include rivets, bolts, or other connecting devices 30. The methods and requirements for mounting infant car seats 10 using a rear tether strap 22 are strictly governed by Federal Regulations, such as the Federal Motor Vehicle Safety Standard 213, "Child Restraint Systems", which is incorporated herein by reference.

The coordination of the automobile safety belt 16 with the rear tether strap 22 provides for the substantially immovable placement of the infant car seat 10 upon the automobile seat.

A support frame 31 is adapted to rest atop the bottom portion 14 of the automobile seat 12 and selectively provide a plurality of positions for the infant car seat 10. Although the support frame 31 will be described herein in great detail, it should be understood that other means for supporting the infant car seat 10 above an automobile seat 12 will be apparent to those skilled in the art and may be employed without departing from the spirit of this invention.

The support frame 31 consists of a base 32 which in the preferred embodiment is constructed from tubular steel. It should also be noted that, although the base 32 is shown to be made of tubular elements, other structures may be provided to serve the same function.

Extending upwardly from the front portion of the base 32 is a first support member 34 which is pivotally secured to the base 32 at pivot 36. This first support member 34 is generally U-shaped and is rotatably affixed to the base 32 at the pivot 36 by conventional means, such as rivets with sleeves disposed thereabout.

A pair of V-shaped tubular support members 38 are disposed along the opposing parallel sides 35 of the support member 34 and are secured thereto by multiple brackets 40. The brackets 40 each have a plurality of rivets 42 which are operative to affix the V-shaped support members 38 to the first support member 34. The standard seat belt 16 associated with an automobile seat is threaded through the opposing V-shaped support members 38 and when buckled is operative to secure the infant car seat 10 to the automobile seat in a substantially immovable manner. The infant car seat 10 is recommended only for use in passenger cars and locations within such cars which have permanently attached factory installed adult lap belts.

Extending downwardly from the apex of the V-shaped support members 38 is a second support member 44 which is pivotably secured to the inside surface of each V-shaped support member 38 at opposing pivots 46. Again, these pivots 46, in the preferred embodiment, consist of rivets with sleeves disposed thereabout which are adapted to provide for the pivotal movement of the second support member 44. A brace 47 (shown in cross-section) extends between the V-shaped support members 44 and is useful in providing additional strength to the support frame 31.

Dual support straps 48 are pivotably secured to opposite sides of the second support member 44 at pivots 50. These support straps 48 are further secured to opposite sides of the base 32 at pivots 52. Again, these pivots 50 and 52 are of the variety that have been discussed previously. The support straps 48 may be rotated counterclockwise to fold the infant car seat 10 for carrying or storage. It should be apparent, however, that the folded state, wherein the second support member 44 is located in a substantially parallel plane with the base 32, is not intended for use in the automobile.

A seat structure 51 is pivotably secured at various locations to the frame 31 and is adapted to support and restrain the child while in the automobile. In the preferred embodiment the seat structure 51 consists of a plastic body member 54 which is pivotably secured to the first support member 34. The pivotable attachment of the body member 54 to the support member 34 is accomplished by dual pairs of rotatable braces 56, 58, which are secured to both the body member 54 and support member 34.

Although in the preferred embodiment the body member 54 is made of molded plastic, it should be apparent to those skilled in the art that other materials such as metal or wood may be used. Integral with the body member 54 is a folded over shroud 55 which is designed to add strength to the body member 54 and increase its resistance to lateral deformation. The shroud 55 is further adapted to provide attachment loci for many of the elements of the infant car seat 10.

The brace 56 is rotatably secured to the first support member 34 by a rivet 62 and to the molded plastic body member 54 by a rivet 64. Similarly, the brace 58 is rotatably secured to the first support member 34 by a rivet 66 and to a bar 72 which extends between the body member 54 and the shroud 55. The pairs of braces 56, 58 are disposed along the support member 34 at distances which will provide for the plurality of positions described previously.

A locking bar 60 is also rotatably secured to the opposing bars 72 disposed between the body member 54 and the shroud 55. The locking bar 60 is generally U-shaped in structure and has opposing notches 74 along its lower edge which are sized to fit either around the pin 76, when the body member 54 is in the upright position, or about the pin 78 when the body member 54 is in the inclined position. In FIG. 1, the infant car seat 10 is shown in the inclined position; therefore, the locking bar 60 is disposed about the pin 78.

By removing the locking bar 60 from about the pin 78, as shown in FIG. 1, the body member 54 is rotatable into an upright position whereby the brace 56 is substantially perpendicular to the base 32. As indicated previously, this permits the child within the infant car seat to see out the windows of the automobile. A locking means (not shown) is rotatably secured to the locking bar 60 and is operative to retain the bar 60 about either the pin 78 when the body member 54 is in the inclined position or about the pin 76 when the body member 54 is in the upright position.

It should be apparent that the support members 34 may be connected to the base 32, and the support member 38 to the support member 44, by means other than rivets, such as conventional ball joints or other pivot means, thus facilitating rotation of the infant car seat 10 into the plurality of positions disclosed herein.

Figures 5, 6:
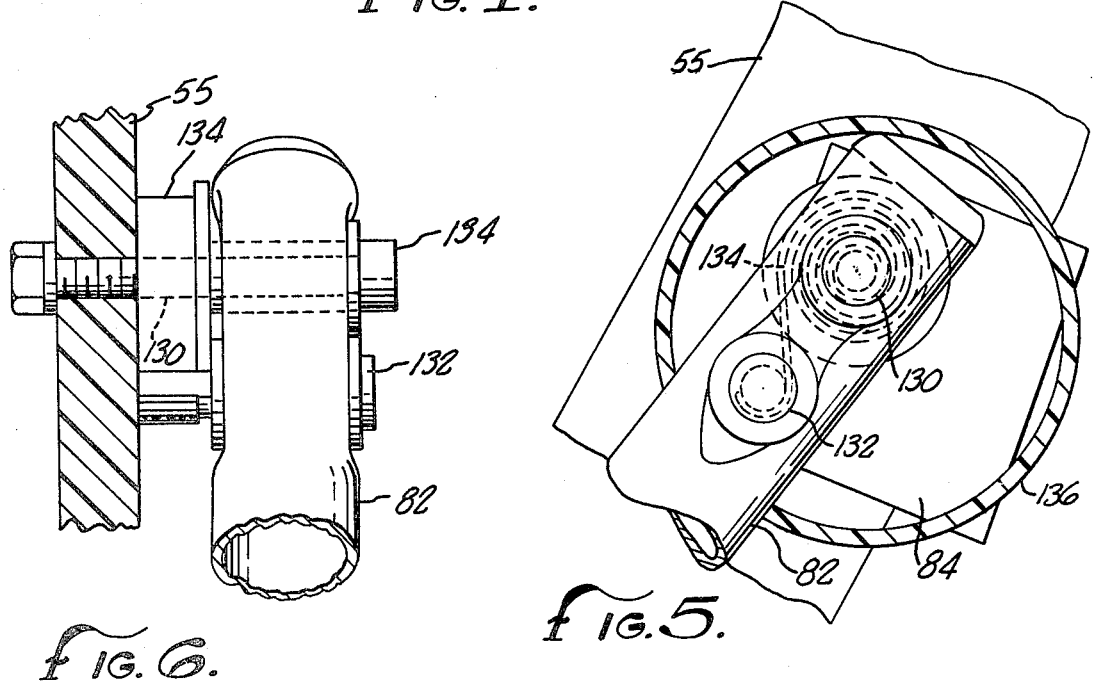
FIG. 5 is a side cross-sectional view of the spring-actuated support frame of the arm rest/shield illustrating the manner in which it is rotatably secured to the infant car seat.
FIG. 6 is a front cross-sectional view of the rotatably mounted support frame of the arm rest/shield of the present invention.

An arm rest/shield 80 is formed from fitting a padded element 81 about a tubular and U-shaped frame 82 which is pivotably secured to the shroud 55 by a brace 84 as shown in FIG. 5. The arm rest/shield 80 may have various forms but to be operative with the present invention should extend substantially through the area in front of the child when in the infant car seat 10. The arm rest/shield 80 is illustrated with solid lines in FIG. 1 in its operative position, and in phantom lines in its raised or inoperative position.

In FIG. 2, the arm rest/shield has moved to its raised or inoperative position under the action of a spring or other suitable biasing means. In this position the inside of the body member 54 is opened to permit easy placement of the child into the infant car seat 10. The body member 54 has an integral head portion 83, a chest portion 85 and a seat portion 86 which portions are adapted to partially surround and protect the child. Integral with the chest portion 85 and bottom portion 86 are dual molded arm rests 87 which are partially formed from the folded-over shroud 55. All of the portions, 83, 85, 86 which face the child, and the interior portions of the arm rest 87 are preferably covered by protective upholstery 88 which is functional to increase the comfort of the child when placed in the infant car seat 10 and to afford additional protection.

Spaced apart and located within the chest portion 85 are dual upper slots 90 and dual lower slots 92 which extend entirely through the body member 54. These slots 90, 92 are adapted to provide mutliple entry locations for the straps which make up the internal harness system that will be described hereinafter. There is similarly provided multiple seat slots 94 and a crotch slot 96 which also extend entirely through the body member 54 and provide for the entry of the other components of the internal harness system.

In FIGS. 2, 3, and 4 the orientation of the various safety straps of the internal harness system is illustrated. A continuous belt 100 is draped in back of the chest section 85 of the body member 54 and is caused to pass through the slots 90 or 92. The slots 90, 92 through which the belt 100 passes depend upon the size of the child to be supported in the infant car seat 10.

The belt 100 has slidably engaged dual clasps 102 located along its length. These clasps 102 are present on the belt 100 after it has passed through its body member 54 and into the interior section of the seat structure 51. The dual clasps 102 are adapted to be utilizable with a buckling means to secure the child within the internal harness system. The belt 100 also extends through both of the seat slots 94 and along the outside of the seat portion 86. An adjustment means 104 is disposed along the continuous belt 100 preferably after it has passed through the slots 90 or 92 and is adapted to vary the effective length of the belt 100 making the infant car seat 10 functional with children of different sizes.

As best illustrated in FIGS. 2 and 4, a crotch strap 106 extends the entire length of the chest portion 85 and is secured to the belt 100 by folding said strap 106 about the loop 108 formed by the belt 100 and securing the two portions of the folded crotch strap 106 by conventional means such as stitching 110. At the other end of the strap 106, and after the strap 106 has passed through the seat slot 96, a buckling element 112 is secured to the strap 106 by a folded-over portion 114 and associated stitching 116. The buckle 112 is adapted to receive the two clasps 102 and provide for the locking of the internal harness system.

Provided with the buckling means is also a releasing means to facilitate rapid unbuckling of the internal harness system and removal of the child. The releasing means will simultaneously permit the removal of the two clasps 102 from the buckling element 112, thus enabling the adult to remove the child from the infant car seat 10 in only one operation.

In FIG. 3, the infant car seat 10 is illustrated in its operative condition as though a child had been placed within the body member 54. The arm rest/shield 80 is rotated into its lowermost position wherein the padded element 81 contacts the upwardly extending arm rests 87 of the seat portion 86. A loop strap 120 is secured to the lowermost portion of the arm rest/shield 80 and is adapted to receive the crotch strap 106 thus maintaining the arm rest/shield 80 in the lowermost position when in the operative condition.

As best shown in FIG. 3, the restraint and protective advantages shown by the present invention are accomplished by placing the strap 106 through the loop 120 when the arm rest/shield 80 is in its lowermost position. By then engaging the buckle 112 with the claps 102 the child will be entirely strapped within the infant car seat 10. The shoulder straps 122 resist movement of the child's shoulders in the event of a rapid stop or deceleration of the automobile. The lap straps 124, also formed from the belt 100, will resist movement of the child's pelvis. In addition, the crotch strap 106 serves two basic purposes. Principally, the crotch strap 106 is operative to pull the lap straps 124 into the child's pelvis. Secondly, the crotch strap 106, when properly utilized, will maintain the arm/rest shield 80 in the operative position.

A band 126 slidably engaged with the shoulder straps 122 has a snap-lock 128 associated therewith. The band 126 is movable along the shoulder straps 122 depending upon the height of the child sitting within the infant car seat 10.

An important innovation of the present invention over the infant car seats presently available is the use of only one belt 100 to fashion multiple restraining straps 122 and 124. This is highly desirable because of the decreased possibility that a failure may arise if multiple belts are utilized. It should be understood however that although the present invention illustrates one belt 100, multiple belts (not shown) may be used to form the straps of the five-point harness system.

As best shown in FIGS. 5 and 6, the means by which the tubular frame 82 is rotatably affixed to the shroud 55 comprises a main bolt 130 which extends through the frame 82 and the shroud 55. A second bolt 132 extends through the frame 82 but does not extend through the shroud 55. A sleeve 131 is secured to the frame 82 and is disposed about the bolt 130 to provide for the rotation of the frame 82.

Placed about the bolt 130 and secured thereto is a spring 134 which is also affixed to the bolt 132. The spring 134 is disposed to impart a constant upwardly extending force on the frame 82 causing its rotation into the raised position as illustrated in FIG. 2, when the arm rest/shield 80 is not being maintained in the lower position by the proper utilization of the internal harness system. Although in the preferred embodiment springs 134 are shown to bias the arm rest/shield 80 to a raised position, it should be understood that other mechanisms may be employed to accomplish the same purposes. Optionally a plastic cap 136 may be provided to house the biasing elements of the pivotable arm rest/shield 80.

To operate the infant car seat 10 of the present invention, the support member 44 is rotated until it is held in place by the posts 140 extending upwardly from the base 32, shown in FIG. 1. Secondly, the locking bar 60 is placed about either the pin 76 or the pin 78 depending upon whether the infant car seat 10 is to be used in the inclined position, as shown in FIG. 1, or in the upright position. The infant car seat 10 is then placed atop an automobile seat 14 and is secured thereto by threading the seat belt 16 over the V-shaped support members 38 and locking the seat belt 16 in a conventional manner. Thus, as indicated previously, the infant car seat 10 may be positioned in either the inclined or the upright position without having to readjust the seat belt 16.

As best shown in FIG. 2, the arm rest/shield 80 will automatically rotate into the uppermost position if the internal harness system is opened. This is accomplished by action of the springs 134. The shoulder straps 122 and lap straps 124 formed from the continuous belt 100, and discussed previously, may then be separated to permit placement of the child within the body member 54. After the child has been placed in the infant car seat 10, the arm rest/shield 80 is then drawn downward until the padded element 81 rests atop the arm rests 87. In that position the loop 120 will be at a lowermost position within the body member 54. The strap 106 may then be pulled through the loop 120 and the clasps 102 engaged with the buckle 112. The band 126 is then slid to its desired location upon the shoulder straps 122 and is made operative by closing the snap-lock 128.

When the internal harness system is properly utilized, the child's legs will be disposed on opposite sides of the crotch strap 106 and the child's head will fit between the shoulder straps 122. The child's pelvis is held firmly to the seat section 86 by the lap straps 124 which are maintained in their position by the action of the crotch strap 106. The child's arms are then positioned atop the arm rest/shield 80.

As is apparent, the arm rest/shield 80 will only remain in its lowermost position when the buckle 112 has engaged the clasps 102 and the crotch strap 106 is pulled through the loop 120. This is an important safety feature not found in the prior art, thus assuring the adult that all safety straps have been properly engaged. Similarly, should the child during the course of travel have occasion to inadvertently open the buckle 112 and release clasps 102, the rotation of the arm rest/shield 80 will warn the adult of the inoperative condition of the straps 122 and 124.

It should be appreciated that when the child is entirely strapped within the infant car seat 10, he will not be able to move forward because of the shoulder straps 122 nor will the child be able to slide out of the bottom of the infant car seat 10 because of the crotch strap 106 and lap straps 124. In addition, the rigid, one-piece body member 54 surrounding the child protects him from contact, blows or other shocks that could be harmful to the child.

Although not illustrated herein, the infant car seat 10 is also utilizable in a reversed position. This is particularly useful for very small children. Briefly, the infant car seat 10 is turned 180 degrees from its orientation in FIG. 1 so that the back portion 85 faces the automobile back portion 12. The seat belt 16 is then draped and buckled about the base 32 at its juncture with the first support member 34. In the event of a sudden deceleration of the automobile, the body member 54 will restrict the child's movement toward the front of the automobile, thus preventing serious injury. The straps 122 and 124 will restrict a child's movement toward the back portion 12 if there is a recoil action.

It will be seen that the objects set forth hereinabove, including those naturally derivable from the aforementioned disclosure, are efficiently achieved. It should also be apparent that since colorable changes may be made in the above configuration without departing from the spirit of the invention, it is intended that all matters contained in the above-described preferred embodiment and shown in the accompanying drawings shall be interpreted as exemplary and not as limiting the scope of the claims.

We claim:

1. An infant car seat for use in protecting and restraining a child, comprising in combination:
   a substantially rigid body member contoured to form head, back and seat portions;
   a support frame secured to said body member and adapted to rest said body member on an automobile seat;
   a means for securing said support frame to said automobile seat;
   an internal harness system attached to said body member and adapted to fit about a child;
   a rotatable arm rest/shield secured to said body member;
   a biasing means cooperatively connected to said body member and said arm rest/shield for biasing said arm rest/shield to a raised position;
   a means cooperative with said internal harness system and said arm rest/shield for maintaining said biased arm rest/shield in a lowered position in front of said child.

2. The infant car seat of claim 1, wherein said support frame has a means associated therewith for pivoting said body member into a plurality of positions.

3. The infant car seat of claim 1, wherein said support frame securing means comprises:
   a means for receiving an automobile seat belt, and a means for maintaining said body member substantially next to said automobile seat.

4. The infant car seat of claim 1, wherein said internal harness system comprises shoulder, lap and crotch restraining means.

5. The infant car seat of claim 4, wherein said internal harness system has a single means for securing said shoulder, lap and crotch restraining means in a cooperative engagement.

6. The infant car seat of claim 4, which includes a means for adjusting said internal system to accommodate different sized infants.

7. The infant car seat of claim 4, wherein said shoulder and lap restraining means are formeed from a single belt.

8. An infant car seat for use in an automobile, said car seat adapted to restrain and protect a child, said car seat comprising:
   a body member adapted to receive a child,
   a means for supporting said body member above an automobile seat;
   an internal harness system attached to said body member and adapted to support and restrain a child,
   an arm rest/shield rotatably attached to said body member and adapted to maintain a first position in front of said child or a second position above said child,
   a biasing means cooperatively associated with said body member and said arm rest/shield for causing said arm rest/shield to normally assume said second position,
   a means cooperating with said arm rest/shield and said internal harness system for maintaining said arm rest/shield in said first position.

9. The infant car seat of claim 8 wherein said biasing means includes at least one spring.

10. The infant car seat of claim 8, wherein said internal harness system has dual shoulder and lap straps, and at least one crotch strap.

11. The infant car seat of claim 10, which includes at least one means to cooperatively engage said shoulder and lap straps to said crotch strap.

12. The infant car seat of claim 11, which includes a means for adjusting said internal harness system to receive children of different sizes.

13. The infant car seat of claim 8, wherein said supporting means has a means integral therewith for selectively causing said body member to pivot into a plurality of positions.

14. An infant car seat adapted for use in an automobile and operative to protect and restrain a child, said infant car seat comprising,
   a means for supporting a child,
   an internal harness system attached to said supporting means, said internal harness system adapted to support and restrain a child,
   an arm rest/shield rotatably affixed to said supporting means said arm rest/shield adapted to rotate between a lowered position and a raised position, said arm rest/shield biased to said raised position,
   a means cooperative with said internal harness system for maintaining said arm rest/shield in said lowered position in front of said child.

* * * * *